United States Patent [19]

Boyd, Jr.

[11] 4,100,444
[45] Jul. 11, 1978

[54] DYNAMOELECTRIC MACHINE WINDING ARRANGEMENT

[75] Inventor: John H. Boyd, Jr., DeKalb, Ill.

[73] Assignee: General Electric Company, Fort Wayne, Ind.

[21] Appl. No.: 617,687

[22] Filed: Sep. 29, 1975

[51] Int. Cl.² .................................................. H02K 3/00
[52] U.S. Cl. ....................................... 310/184; 310/72; 310/200
[58] Field of Search ............... 310/170, 180, 181, 184, 310/166, 172, 198–209, 40 MM, 72; 318/220 B, 220, 225 R, 224, 216

[56] References Cited

U.S. PATENT DOCUMENTS

| | | | |
|---|---|---|---|
| 1,726,232 | 8/1929 | Kennedy | 318/220 |
| 2,073,532 | 3/1937 | Ballman | 38/225 |
| 2,236,436 | 3/1941 | Lyden | 318/220 |
| 2,262,376 | 11/1941 | Veinott | 318/220 B |
| 2,474,195 | 6/1949 | Trickey | 318/220 B |
| 2,898,534 | 8/1959 | Rawcliffe | 310/179 |
| 3,153,184 | 10/1964 | Stout | 318/224 |
| 3,359,476 | 12/1967 | Charlton | 318/224 |
| 3,432,707 | 3/1969 | Peters | 310/180 |
| 3,439,205 | 4/1969 | Houtman | 30/180 |
| 3,470,409 | 9/1969 | Scheda | 310/166 |
| 3,515,922 | 6/1970 | Fong | 310/202 |
| 3,673,477 | 6/1972 | Broadway | 310/202 |
| 3,821,602 | 6/1974 | Linkous | 310/198 |
| 3,949,253 | 4/1976 | Broadway | 310/184 |

OTHER PUBLICATIONS

Design Capacitor Motors for Balanced Operation; P. H. Trickey; Trans AIEE; 1935, p. 780 (1-13 to 1-17).
Chapter 25 of "Theory and Design of Small Induction Motors" by C. G. Veinott; 1959, McGraw-Hill Book Co., Inc.
"Equivalence Theorems, Analysis, and Synthesis of Single Phase Induction Motors" by C. G. Veinott; 1959, McGraw-Hill Book Co.

*Primary Examiner*—R. J. Skudy
*Attorney, Agent, or Firm*—Ralph E. Krisher, Jr.

[57] ABSTRACT

A motor is disclosed that is particularly adapted for energization from a single phase power source and that includes a magnetic core having uniformly sized and spaced slots as well as three different winding phases. In one illustrated form, the motor winding circuit includes sub-circuits in the form of a primary phase winding, an intermediate phase winding, and a capacitor phase winding with the different winding phases positioned on the core so that the space angle between the effective centers of poles (or coil groups) of next adjacently located winding phases is sixty electrical degrees. Also disclosed are procedures by which an initial ratio of effective conductors (or turns) in the capacitor phase to effective conductors in the main phase can be calculated as well as an initial ratio of effective conductors in the intermediate phase to those in the primary phase. Design criteria vis-a-vis the sizes of conductors in the three different winding phases are described whereby substantially balanced operation will result when a capacitance, preselected to be across the capacitor phase winding, coincides with that of commonly available or off-the-shelf capacitors. The motor winding circuit also comprises a sub-circuit including an additional winding section that is provided so that multi-speed operation may be achieved. It is preferred to maintain substantially uniform slot fill (or slot space factors) in each of the uniformly sized slots by physically positioning the conductors for such additional winding section in core slots that are also occupied by the intermediate phase winding. Utilization of the invention results in higher operating efficiencies as compared to present "state of the art" motors - and more particularly when utilized as four-pole, six-pole, etc. motors which may generally be characterized as "conductor starved".

36 Claims, 10 Drawing Figures

DYNAMOELECTRIC MACHINE WINDING ARRANGEMENT

BACKGROUND OF THE INVENTION

The present invention relates generally to dynamoelectric machines and, more particularly, to motors of the type that have a capacitor connected across one winding phase during operation thereof, including so-called permanent-split capacitor (or capacitor run) motors, and that are particularly adapted for energization from a conventional single phase power source.

It has long been understood in the art that it would be desirable to design single phase powered capacitor motors so that they will operate (at rated speed) in a "balanced operation" mode. For example, a paper of P. H. Trickey, "Design of Capacitor Motors for Balanced Operation", Trans. AIEE, 1932, p. 780, described a theoretical method of obtaining balanced operating conditions for single phase powered capacitor motors. This approach (as well as Trickey's paper) is further discussed in C. G. Veinott's book "Theory And Design Of Small Induction Motors", published by McGraw-Hill Book Company, Inc. in 1959 (Library of Congress Catalog Card Number: 58-14364).

According to Trickey's approach, which has been followed in the industry, a designer of such motors calculates for a specified load speed (i.e., "rated" speed), among other things, a ratio of the effective number of conductors (or turns) in the capacitor phase to the effective number of conductors (or turns) in the primary or main phase for a quadrature wound motor. This ratio is identified as the "a" ratio in Veinott's book and this same "a" ratio will be referred to and so identified herein. In theory, at least, when a capacitor motor is designed for balanced operation at rated speed, higher operating efficiencies will result; and as indicated by Veinott, during "balanced operation", a useful forward rotating magnetic field exists, but the backward rotating magnetic field is reduced to zero.

As indicated by Veinott, and confirmed by my experience, the requirement of balanced operation fixes both the winding or "a" ration, and the theoretical capacitance for the motor being designed. However, capacitors having capacitances exactly equal to this theoretical value inevitably are not available commercially. Thus, in order to actually construct a motor that would, in the real world, be capable of "balanced operation" a motor designer or engineer would have to manufacture (or have manufactured) a special capacitor having a capacitance exactly equal to the desired "theoretical capacitor".

Obviously, an approach requiring special capacitors would be so uneconomical that it could not be justified in the market place. Therefore (and again as indicated by Veinott), the practice in the art is to select a standard rating of capacitor that is nearest to the "theoretical capacitor", and that will operate near the rated or working voltage (WV) of the capacitor. Although persons skilled in the art are aware of various commercially available capacitor ratings, it is now simply noted for purposes of completeness of disclosure that capacitors are commonly available (for use, for example, at 370 WV) that have a capacitance of 4, 5, 6, 7.5, 10, 12.5, 15, etc., microfarad.

It should now be understood that, in actual practice, it has been necessary to compromise and depart from the theoretical teachings of Trickey because of capacitor availability limitations.

By way of further background, it is now pointed out that it should be possible to at least closely approach two winding balanced operation for single phase powered, permanentsplit capacitor motors by calculating a sinusoidal winding distribution (in the manner known in the art as evidenced, for example, by the above-cited book of Veinott) and "grade" the slot areas so that there would be uniform slot fill. One disadvantage of a "graded" slot approach, however, is that a core comprised of graded slot punchings is specifically optimized for a single number of poles (e.g., 2 pole, 4 pole, or 6 pole) and a fixed start to main winding shift angle. "Shift angle" means, of course, the angle by which a capacitor phase winding is shifted relative to a main winding (other than 90 electrical degrees) as taught, for example, in Linkous U.S. Pat. No. 3,821,602.

Another problem that is frequently addressed by a motor designer involves maximizing core slot utilization (i.e., maximum filling of core slot openings with conductor material). This problem is particularly vexatious for capacitor motor applications wherein uniform slot punchings are utilized to accommodate so called "extra main" and/or tapped main windings for multiple speed motors. Such motors are disclosed, for example, in Linkous U.S. Pat. No. 3,821,602, the entire disclosure of which is incorporated herein by reference. It thus should now be understood that it would be desirable to provide single phase powered capacitor motors that can be operated in a substantially balanced mode of operation and, more particularly, that may be constructed while utilizing uniform slot punchings (so that motors of different pole numbers may be built with the same punching), and while obtaining a uniform (and preferably high) degree of slot fill, at least for multi-speed designs.

Although the above-mentioned design techniques of Trickey are for winding arrangements wherein the capacitor winding phase and main winding phase are in quadrature relationship; and improved motors of the type disclosed by Linkous include non-quadrature windings; Trickey's techniques may nonetheless be utilized in analyzing and designing non-quadrature wound motors. One way in which Trickey's techniques may be so used simply involves defining or establishing the desired non-quadrature angular relationship between the capacitor winding phase and main winding phase and then utilizing the techniques described by S.S.L. Chang in his 1956 paper ("Equivalence Theorems, Analysis, and Synthesis of Single-Phase Induction Motors with Multiple Nonquadrature Windings", Trans AIEE, "Power Apparatus and Systems", 1956, pp. 913–916) to determine an equivalent two-winding orthogonal motor, and then use Trickey's analytical approach for such equivalent motor. Thereafter, if Trickey' approach indicates a desirable modification or change in such equivalent motor; the modified equivalent motor may be used in the "synthesis" of a more optimized multiple, non-quadrature motor by following the synthesis steps described by Chang.

Utilization of all of the above-mentioned techniques has advanced the art, but experience has shown that, particularly for uniform slot multi-speed capacitor motors having more than two poles, some slots of the core will have relatively large amounts of conductor therein, while other slots of the core will have lesser amounts of conductor therein; and this is believed to be due (at least in part) to the constraints of maintaining the necessary "a" ratio involving two winding phases.

Generally speaking, when an untapped main phase winding and a capacitor phase winding are provided for a single speed motor, better slot utilization (i.e., a higher and more uniform degree of slot fill) would be otainable by distorting the winding distributions from desirable sinusoidal distribution configurations. In other words, it would be necessary to make the winding distribution less sinusoidal. This, however, would introduce the problem of establishing greater in magnitude harmonic torques which would detract from the useful output of the motor, and result in lower operating efficiency.

It is generally known that conventional three-phase motors operate in a "balanced condition", in the sense that the rotor is subjected to substantially no backward revolving field. It has also at least been proposed that a conventional Wye-connected three-phase motor (having three substantially identical winding phases A, B, C) may be energized and operated on a conventional single phase power source. This may be done by connecting the end of winding phase A to the first side of the single phase power supply; connecting the end of winding phase B to the second side of the single phase power supply; and by connecting a capacitor across the ends of winding phases B and C.

While a conventional three-phase wound motor (when connected as just described) will operate on single phase power; the above-described problems vis-a-vis multi-speed operation, and relatively uniform and optimized slot utilization of tapped or "extra-main" multi-speed motors would still remain. Moreover, such a three-phase motor would be expected to only rarely be operable in a "balanced condition"; or to only rarely produce as much full load torque (i.e., torque at rated speed when single phase powered) as it would when operated on three-phase power.

The reference that has just been made to "only rarely" is meant to indicate that, for any given conventional motor having three similar or substantially the same winding phases; there would be a capacitance value for a capacitor (in theory, at least) that would permit balanced operation of such three-phase motor from a single-phase power source. This however, brings the entire consideration of conventional three-phase motors full circle to precisely the problems (identified above, for example, in trying to implement fully Trickey's teachings) that occur because of real world capacitor limitations.

Moreover, even if a conventional three-phase motor were designed with conventional state of the art three-phase motor design techniques so as to be "matched" to an available capacitor and energized by a single-phase power source, it is believed that "balanced operation" would occur at a speed much closer to the synchronous speed (and therefore a much higher speed as compared to a more normal three-phase motor rated speed) of such motor. As will be understood, the speed point for such "balanced operation" would be such that a much lower output torque would result (as compared to the magnitude of the output torque usually available or expected if such motor were to be operated at a more usual, three-phase motor rated speed).

In view of all of the foregoing, it will now be understood that it would be desirable to provide single phase powered or energized motors having a capacitor phase (at least during running conditions) and wherein such motors would be characterized by efficiencies of a magnitude that are improved as compared to the present state of the art. It would also be desirable to provide new and improved single phase powered capacitor motors that represent a departure from the prior art in a fundamental way in order to overcome the limitations on actual attainment of balanced operation (at least because of real world capacitor limitations), and yet which may be optimized in design for different applications (e.g. different horsepower ratings; voltage ratings; pole number; and reasonable rated speeds in the vicinity of, e.g., speeds at which seventy percent of maximum torque would be available; etc.). It would also be desirable to be able to design such motors by using, to the extent possible, existing state of the art motor design techniques or procedures.

Accordingly, a general object of the present invention is to provide new and improved single phase powered motors having a capacitor phase winding (at least during running conditions) that are capable of substantially balanced operation and that therefore may have improved efficiency characteristics; and especially such motors having uniform slot punchings whereby essentially the same punching configuration may be used for 2 pole, 4 pole, 6 pole, 8 pole, etc. motors embodying the invention.

It is a more particular object of the present invention to provide fractional horsepower, single phase powered, permanent split capacitor motors that are capable of substantially balanced operation and that utilize magnetic cores having uniformly sized and spaced slot openings.

It is a still more specific object of the present invention to provide single phase powered, multi-speed capacitor motors having four or more poles wherein substantially uniform slot space factors, (i.e. degree of slot fill) are obtained in cores having uniform slots.

It is a further object of the present invention to provide new and improved single phase powered capacitor motors which are capable of substantially balanced operation and which utilize a primary phase winding, an intermediate phase winding, and a capacitor phase winding.

More generally stated, other objects are to provide new and improved single phase powered capacitor motors which are capable of high speed operation that more closely approaches balanced operation than heretofore, and yet which are not subject to previously known restrictions vis-a-vis calculated theoretical capacitors.

SUMMARY OF THE INVENTION

In carrying out the above and other objects of the present invention, I provide (in one illustrated embodiment), a motor particularly adapted for energization from a single phase power source and which includes a magnetic core having uniformly sized and spaced slots as well as three different winding phases. In a peferred form, I have provided a primary phase winding, an intermediate phase winding, and a capacitor phase winding with the different winding phases positioned on the core so that the space angle between the effective centers of poles (or coil groups) of next adjacently located winding phases is sixty electrical degrees. In one form, the ratio of effectively conductors (or turns) in the capacitor phase to effective conductors in the main phase are within a first predetermined range; the ratio of effective conductors in the intermediate phase are within another predetermined range; and the sizes of conductors in the three different winding phases are proportioned in a preselected manner so that substantially balanced operation will result when a capacitance, preselected to be across the capacitor phase winding, coincides with that of commonly available or off-the-shelf capacitors.

In still another preferred form of an embodiment of the invention, and as also illustrated herein; the motor winding circuit comprises sub-circuits, including one or more additional winding sections, that may be provided so that multi-speed operation may be achieved. In this case it is preferred to maintain substantially uniform slot fill (or slot space factors) in each of the uniformly sized slots by physically positioning the conductors for such additional winding section in core slots that are also occupied by the intermediate phase winding.

Utilization of my invention results in higher operating efficiencies as compared to present "state of the art" motors — and more particularly when utilized as four-pole, six-pole, etc, motors which may generally be characterized as "conductor starved".

All of the above-mentioned features and objects of the present invention, as well as other, will be better understood by reference to the following description of a preferred embodiment of the invention, taken in conjunction with the accompanying drawings wherein:

DESCRIPTION OF PREFERRED EMBODIMENTS

Figure 3:
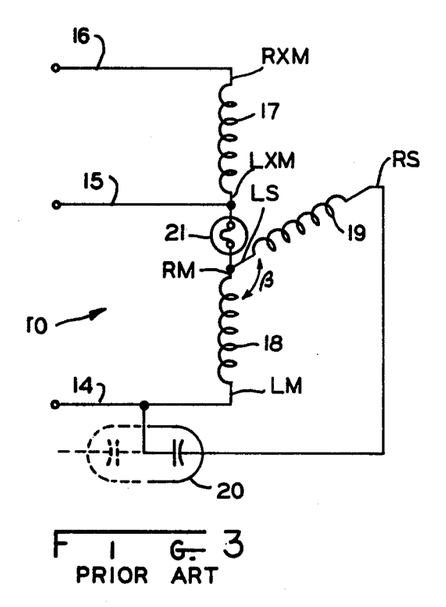
FIG. 3 is an electrical schematic of a prior art approach as described in the above-referenced Linkous patent.
Figure 5:
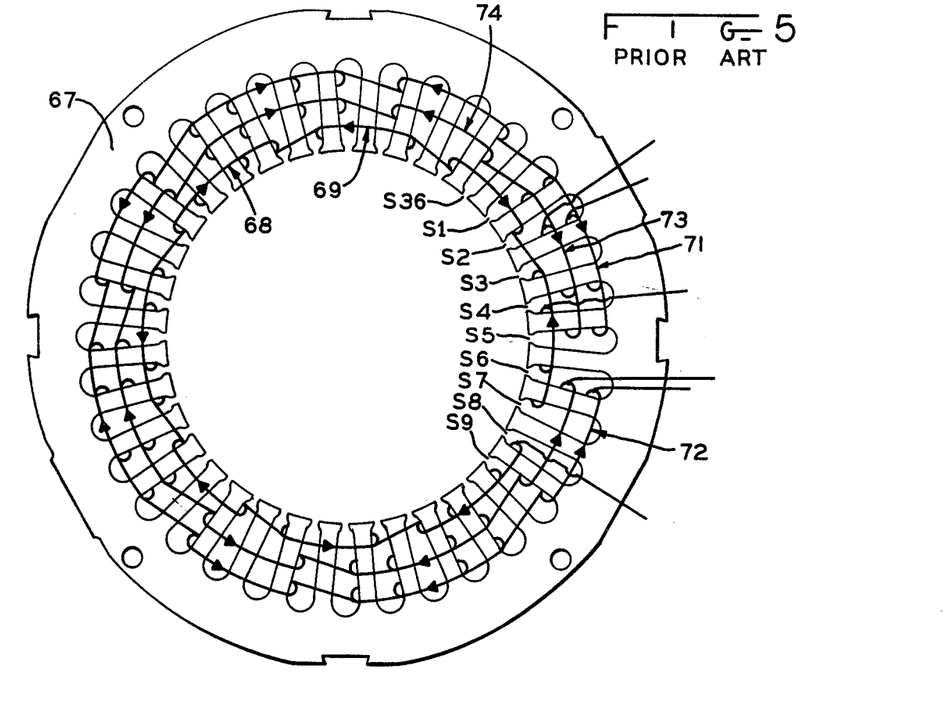
FIG. 5 is an illustration of a stator assembly of a motor constructed substantially as taught in the abovereferenced Linkous U.S. Pat. No. 3,821,602.

Turning first to FIGS. 3 and 5, it will be understood by persons skilled in the art that the operation at different speeds of motors having serially connected distributed winding sections is accomplished by selectively energizing different ones of the winding sections. This in turn varies the number of volts applied per winding turn and thus varies the output torque produced at any given speed.

Thus, with particular reference to FIG. 3, high speed operation of motor 10 will occur when leads 14 and 15 are connectd to a conventional single phase power source; whereas a lower operational speed results when the leads 16 and 14 are connected to the same power source. of course, operation at one or more intermediate speeds may also be accomplished by providing connection leds that tap the extra winding section 17 at one or more points between the ends of winding section 17.

It will be understood that a motor constructed according to FIG. 3 (all as pointed out in substantially more detail in the incorporated by reference Linkous U.S. Pat. No. 3,821,602) includes a main winding 18 (which incudes the extended section 17) and which is wound to provide a primary winding of any desired number of poles.

The auxiliary winding 19 in FIG. 3 is provided with the same number of poles as that of the primary winding 17, and the coil groups of the auxialiary winding 19 may be physically placed on the stator core so that the instantaneous effective center of the poles established thereby (or polar axes of the auxiliary winding 19) are displaced at an angle $\beta$ of more than 90 electrical degrees (in a direction opposite to the direction of rotor rotation) relative to the instantaneous effective pole centers (or polar axes) of the poles established by the main winding 18.

It will be particularly noted that a conventional thermal protector 21 is utilized in the circuit of FIG. 3 to protect all winding sections regardless of connection, and also shown is a conventional commercially available capacitor 20 (described in more detail by Linkous).

FIG. 5 is an eight pole prior art type of motor designed in accordance with the teachings in the Linkous patent, and is included herein to facilitate comparisons of state of the art prior art motor structures with motors that embody the present invention. Accordingly, the reference numerals used in FIG. 5 correspond to reference numerals that identify corresponding motor parts and winding ends or leads in FIG. 3.

Figure 4:
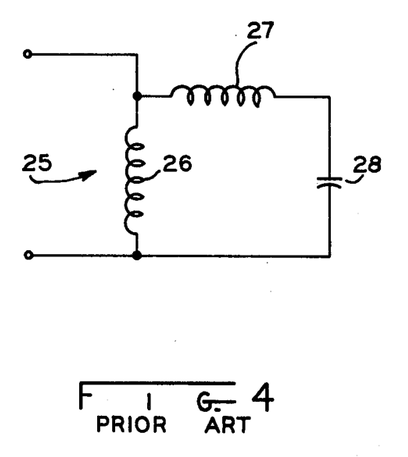
FIG. 4 is an electrical schematic representation of the type of motor considered in the above-referenced paper of Trickey and in Veinott's book.

FIG. 4 schematically illustrates a quadrature wound prior art type of single phase, single speed, permanent-split capacitor motor 25 that would be of the type analyzed and referred to in the above-referenced paper of Trickey. The motor 25 (which could be of any desired number of poles, but which will be considered to be a two pole motor for purposes of discussion herein) includes a main winding 26; an auxiliary winding 27, and a capacitor 28.

Figure 1:
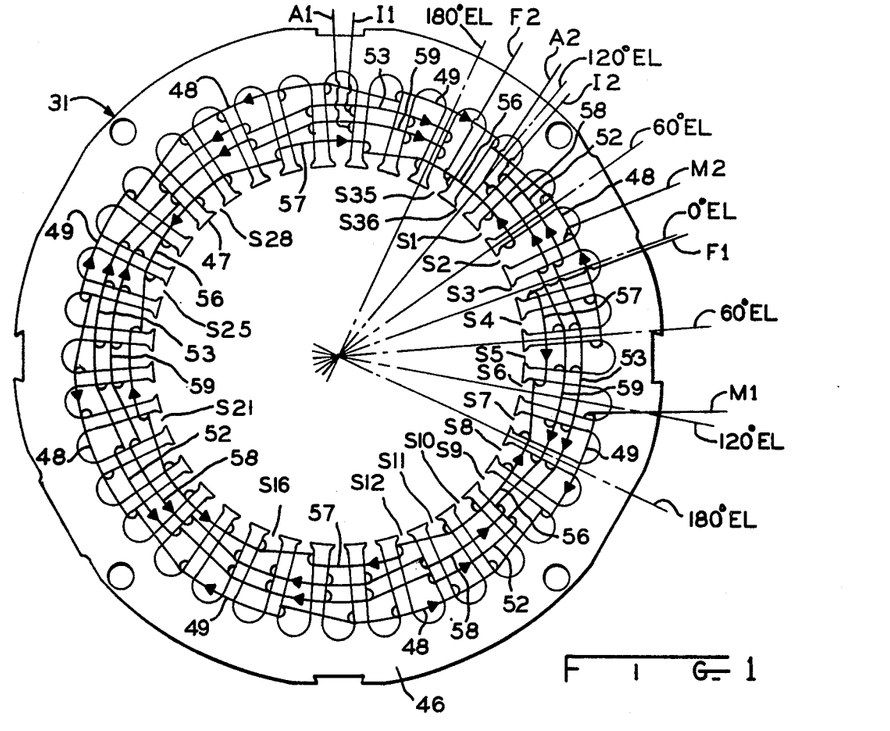
FIG. 1 is an end view of a stator assembly of a motor embodying the invention in one preferred form, and provided with a main, intermediate, and capacitor phase winding, as well as an extra winding section.
Figure 6:
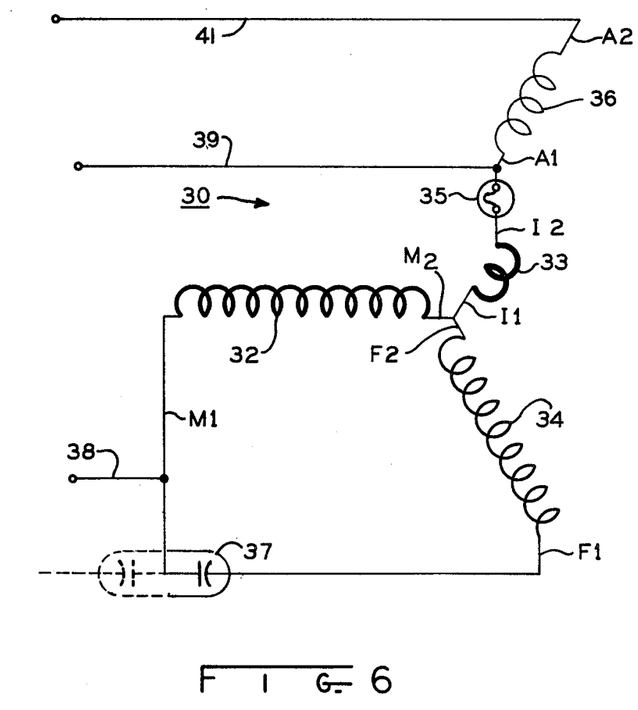
FIG. 6 is a simplified schematic representation of the motor utilizing the stator assembly of FIG. 1.

FIG. 6, on the other hand, is a schematic representation of a motor that embodies the present invention in one preferred form thereof and that includes the stator assembly of FIG. 1. With reference now to FIG. 6, the motor 30 includes the stator assembly 31 (see FIG. 1), and thus includes a primary or main phase winding 32, an intermediate phase winding 33, and a capacitor phase winding 34. When multi-speed operation is desired, winding sub-circuit means in the form of one or more additional or supplemental winding sections (or a tapped single section) 36 may also be provided, as illustrated in FIGS. 1 and 6. FIG. 6 also represents a two section capacitor 37 which may, for convenience, be supplied by a user of motor 30. However, it will be expressly understood that a single or multisection capacitor may be attached to, or otherwise accompany, motors produced according to the invention at the time such motors are sold.

With the winding sub-circuits of the winding circuit of motor 30 (i.e., the three high speed winding phases and extra main section) connected as illustrated in FIG. 6, and the high speed sub-circuits thereof optimized for efficiency, substantially balanced operation will result when leads 38 and 39 are connected across a single phase power source, and a second lower operating speed will result when leads 38, 41 are connected across the same source. A thermal protector 35, similar to protector 21 in FIG. 3, will protect the winding circuit of motor 30 during operation.

Figure 7:
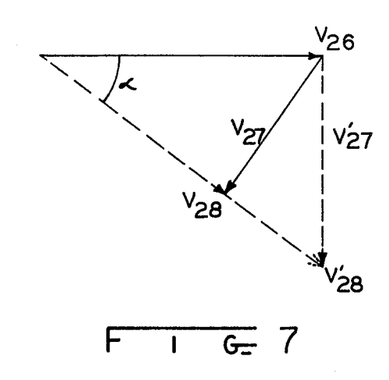
FIG. 7 is a simplified diagram to represent voltage vectors associated with prior art motors and which is a useful starting point for initiating the design of motors embodying the present invention.

The manner in which substantially balanced operation is attained with motor 30, even though a discrete value commercially available capacitor 37 is used across capacitor phase winding 34 will be best understood by regressing momentarily to the prior art representations of FIGS. 4 and 7.

By applying the teachings and techniques presented in the above-referenced Veinott book, and following the procedures that are thoroughly documented in chapter 25 thereof, a person skilled in the art can fully design or define a permnent-split capacitor motor that will provide a desired amount of torque at a "rated" (or specified) speed. When following Veninott's procedures, sample calculations as itemized by Veinott are iterated until a final motor design is obtained that satisfies the designer's initial criteria.

Once the final design is arrived at for such a motor, the values for various ratios and circuit parameters will have been obtained. For example, an initial "a" ratio is obtained which, by definition, is the ratio of the number of effective turns of the auxiliary winding (for example, winding 27 of FIG. 4) to the number of effective turns of the primary winding (for example, winding 26 in FIG. 4). This number "a" is also, by definition, the tangent of the angle α in FIG. 7.

In the vector diagram of FIG. 7, the vector $V_{26}$ represents the line voltage and thus the voltage across winding 26 during both initial and final calculation procedures. The vector $V'_{27}$ denotes the voltage vector for the capacitor phase winding 27 if the motor of FIG. 4 were in fact exactly designed for "balanced operation". On the other hand, the vector $V'_{28}$ denotes the capacitor voltage for a theoretical capacitance that capacitor 28 would have to provide if balanced operation were to be achieved in fact.

The final actual design of the motor 25 actually comprises a compromise due to the unavailability of capacitors having the exact capacitance required for balanced operation. It is because of this that voltage vectors for the finally designed motor are represented in FIG. 7 as the vectors $V_{26}$; $V_{27}$; and $V_{28}$. It will be understood that the direction of the vector $V_{28}$ would not, in reality, exactly coincide with the direction of the vector $V'_{28}$; but the deviation in direction of these two vectors has been ignored in FIG. 7 for ease of illustration.

At this point it is also noted that (for ease of explanation) considerations involving the size of conductor material to be used to make the windings 26 and 27 of motor 25 (FIG. 4) have been disregarded. However, consideration that must be given to selection of relative wire sizes and the effect that such selection has on the "a" ratio is fully treated by Veinott and understood by persons skilled in the motor winding circuit art. It also will be understood that, although windings 26 and 26 of the finally designed motor 25 might physically appear to be in quandrature relationship when examined on a magnetic core, the necessity of using an actual capacitor 28 (whose capacitance only approximates the desired theoretical capacitance) results in the non-quadrature voltage vector relationship between vectors $V_{26}$ and $V_{27}$ as shown in FIG. 7.

Figure 8:
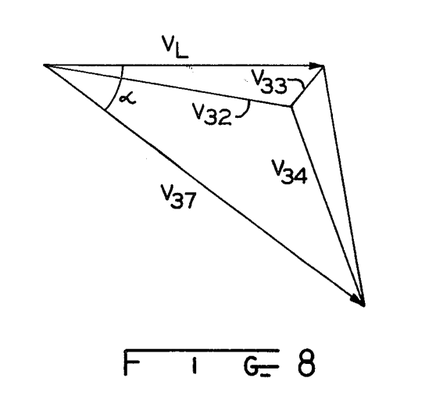
FIG. 8 is a simplified diagram that represents voltage vectors that are associated with motors embodying the present invention, this Figure being useful in explaining one procedure by which motors embodying the present invention may be designed.

With reference now to FIGS. 6 and 8, a simplified technique for designing motors embodying the present invention and comprising a winding circuit which includes a triad of winding phases for high speed operation will not be explained. For the purpose of this explanation, it is assumed that the motor 30 (FIG. 6) is to be designed to at least match (when connected for high speed operation) the performance of the motor 25 assuming that motor 25 has the same number of poles as motor 30 and has been actually designed and manufactured for balanced operation.

With reference now to FIG. 8, the vector $V_L$ is drawn to represent the line voltage to be applied across leads 38 and 39 of motor 30 in FIG. 6. Since this line voltage is the same as the line voltage that would be utilized when energizing the motor 25 of FIG. 4, the voltage vector $V_L$ is drawn equal to the voltage vector $V_{26}$ of FIG. 7. The angle α (from FIG. 7) is then plotted in FIG. 8 to establish the direction of vector $V_{37}$ which vector (once its scalar value is determined) will represent the voltage across capacitor 37 in FIG. 6. In order to determine the scalar value of vector $V_{37}$; an available capacitor is selected for use as capacitor 37. At this point, it should be noted that the initial design of the motor of FIG. 6 involves, at the outset, selection of an available capacitor. The selected capacitor 37 will have a known, selected capacitance C (in microfarads), and the capacitive reactance, $X_C$ of selected capacitor 37 may be calculated for a supply frequency $f$ (in hertz) by solving the relationship $$X_C = \frac{2\pi f C}{10^6}.$$

Next, the voltage $V_C$ across the selected capacitor is calculated using the relationship $$V_C^2 = \frac{X_C W_{in}}{PF}.$$

In this relationship, $W_{in}$ may be taken to be the previously determined watts input for the finally designed motor 25; and PF may be taken to be the previously determined power factor for the finally designed motor 25. $V_C$ (as calculated) is then used as the scalar value for vector $V_{37}$ in FIG. 8.

After vector $V_{37}$ has been drawn; the tips of the vectors $V_{37}$ and $V_L$, and the apex of angle α are identified and defined as the connection points for three new voltage vectors which will represent the voltages across the different winding phases 32, 33, 34 for the motor 30 (FIG. 6). These voltage vectors are designated $V_{32}$; $V_{33}$; and $V_{34}$ respectively in FIG. 8.

Subsequently (either graphically or mathematically) the triad of voltage vectors $V_{32}$; $V_{33}$; and $V_{34}$ are mutually respectively directed (i.e., relative to adjacent ones of each other) at 120 degrees; and placed on FIG. 8 so as to intersect the tips of vectors $V_L$, $V_{37}$, and the origin. The scalar ratio of $V_{34}$ to $V_{32}$ is then defined as a new turns ratio "K" of the number of effective conductor turns in winding 34 to the number of effective conductor turns in winding 32. Similarly, the scalar ratio of vector $V_{33}$ to $V_{32}$ is defined to be a new turns ratio "L" of the number of effective conductor turns in winding 33 to the number of effective conductor turns in winding 32.

By following the above procedure, the relative number of effective turns for the windings 32, 33, and 34 is determinable; and, these windings are situated on a magnetic core (as shown in FIG. 1) so that the space angle between the effective centers of poles of next adjacently located winding phases is 60 electrical degrees. All that then remains, in order to complete an initial design of the motor 30 is to establish the diameters of the wire used in each winding phase, and the actual number of effective winding turns for one of the winding phases 32, 33, or 34.

In one simplified approach, a wire diameter $d_{32}$ is selected for the primary winding phase 32 to be the same as the wire diameter that was used for the winding 26 of motor 25. The diameter of wire to be used for the capacitor phase winding 34 then is selected so that it will be the next closest common or available size to a wire diameter equal to the diameter of wire selected for winding 32 ($d_{32}$) divided by $\sqrt{K}$ (as defined above). The diameter of wire for winding 33 is then selected to be the next closest available wire size to a wire diameter equal to $d_{32}$ divided by $\sqrt{L}$ (as defined above).

Although selection of wires having diameters in the relationship just mentioned will provide suitable motor performance; virtually identical performance at lower cost can be obtained simply by re-analyzing the motor of FIG. 6 to determine the amount of current flowing through each of the winding phases, and then adjusting the sizes of the wire actually used so that the current density (expressed in amperes per square inch) will be substantially the same in each winding phase. The motor 30, when designed to this point, can then be analyzed by using the principles set forth in the Chang paper (referenced above) to define an "equivalent" two winding motor which then can be optimized according to the teachings of Veinott. Thereafter, the optimized motor would be used as a basis for again iterating the graphical or vectoral design procedures for motor 30 described above.

An alternative method by which a design for the motor 30 may be arrived at will now be explained, with extensive reference to the step-by-step procedures and calculations described by Veinott. At the very outset, it is noted that page 450 of the above-referenced Veinott book contains a representative design calculation for a two-pole motor that would be capable, in theory of "balanced operation". It is acknowledged that the initial representative calculation so shown by Veinott is a "first pass" at selecting a motor design and that Veinott's procedures would, in fact, be iterated or repeated to finally optimize a motor designed to meet the designer's initial performance and cost criteria. This of course is all within the skill of a person having ordinary skill in the motor design art.

Therefore, for purposes of exemplification only, it is now assumed that the initial sample calculations tabulated by Veinott represent a final and optimized motor design, except for the fact that the required capacitance (in order to provide balanced operation) simply is not available. In the sample calculation of Veinott, a capacitor having a capacitance of 123.7 microfarads is specified. In addition, an "a" ratio of 0.714 and a capacitive reactance $X_C = 21.43$ is tabulated for Veinott's capacitor.

Let us now assume that an equivalent two pole motor embodying the present invention is to be designed to have performance comparable to this calculated motor design of Veinott. Furthermore, it is assumed that it is desired (for reasons of economics) to use a commerically available capacitor having a capacitance $C_2$ of 100 microfarads (rather than Veinott's calculated capacitance $C_1$ of 123.7 microfarads. The capacitive reactance, $X_{C_2}$ of the selected 100 microfarad capacitor may then be calculated to be $X_{C_2} = 26.52$ by using the well-known relationship $$X_C = \frac{10^6}{2\pi f C};$$

where $X_C$ is capacitive reactance, $f$ is the line frequency in hertz, and C is the capacitance of the selected capacitor.

It now further is assumed that the motor 30 must be capable of substantially balanced operation. In order to provide this result, the three windings 32, 33, and 34 will have an electrical space orientation (relative to the core on which such windings are disposed) such that the primary winding phase 32 will have the location of its effective center chosen as a reference point, or zero electrical degrees. This location designation is made arbitrarily, of course, for purposes of explanation. Thereafter, the effective center of the poles of the intermediate phase winding 33 are located at sixty electrical degrees space displacement (on the core) relative to the effective pole centers of the primary phase winding 32; and the capacitor phase winding 34 is located at 120 electrical degress, space displacement, relative to the primary phase winding 32.

Figure 9:
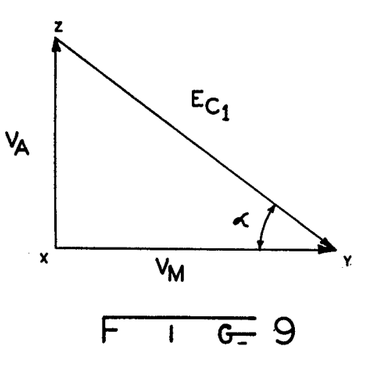
FIG. 9 is a simplified diagram also useful in approaching an understanding of the invention.

Veinott's book (at page 447) shows that a two vector diagram for a two-winding balanced capacitor motor (for example, the motor 25 of FIG. 4) is substantially as shown in FIG. 9.

In FIG. 9, $V_A$ is a vector representing the auxiliary winding voltage (i.e., the voltage across winding 27 in FIG. 4); vector $V_M$ represents the voltage impressed on the main winding (i.e., the winding 26 in FIG. 4); and $E_{C_1}$ is the voltage across a theoretical capacitor (in lieu of actual capacitor 28 in FIG. 4) which would provide balanced operation. Veinott shows that it can be assumed that $V_A$ is equal to $V_M \times a$ where $a$ is the turns ratio referred to hereinabove. Moreover, Veinott shows that it can be assumed that $$E_C = V_M \sqrt{1+a^2}.$$

It is desired to insure that the same volt amperes will be maintained on the selected capacitor 37 as were maintained on Veinott's capacitor $C_1$. Moreover, it is desired to maintain the previously defined vector angle $\alpha$ between $V_M$ and $E_{C_1}$ in FIG. 9.

There are standard engineering relationships that relate voltage drop across two different capacitors to the capacitive reactance of those two capacitors to maintain the same volt amperes and those relationships include:

$$\frac{E^2_{C_1}}{X_{C_1}} = \frac{E^2_{C_2}}{X_{C_2}} \text{ or } E_{C_2} = E_{C_1}\sqrt{\frac{X_{C_2}}{X_{C_1}}}.$$

In these relationships, capacitive reactance of a capacitor is denoted by $X_C$ and the voltage drop across that capacitor is represented by the symbol $E_C$, all as will be understood. The theoretical capacitor from Veinott's page 450 is tabulated as having a capacitive reactance $X_{C_1}$ of 21.43 and voltage $E_{C_1}$ of 141.4; whereas the capacitor for motor 30 (selected above to be 100 microfarads) has a capacitive reactance $X_{C_2}$ of 26.53. Thus, by using the above relationship, $E_{C_2}$ can be calculated as follows:

$$E_{C_2} = 141.4\sqrt{\frac{26.53}{21.43}} = 157.33.$$

Figure 10:
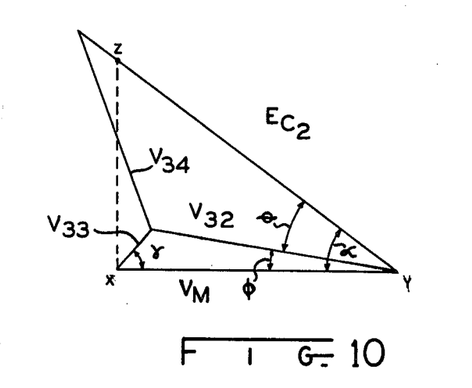
FIG. 10 is a simplified diagram that represents further development of the diagram of FIG. 9.

The points x, y, and z therefore are identified in FIG. 9 nd, since it is desired to maintain equal volt amperes on the capacitor, a new vector for the voltage $E_{C_2}$ should be drawn and directed in the same direction as the vector $E_C$. Rather than superposing this vector $E_{C_2}$ (and others that are now to be defined) on FIG. 9, a new vector diagram which illustrates vector $E_{C_2}$ as shown in FIG. 10 is utilized wherein the points x, y, and z correspond exactly to the points x, y, and z in FIG. 9. Thus, the vector $E_{C_2}$ passes through the points y and z, and the angle α is maintained between the line voltage vector $V_M$ and the capacitor vector. Three lines then are generated, each at 120 mechanical degrees with respect to the other which pass through the three points x, y, and z. These three vectors (mutually spaced from one another by 120 mechanical degrees) will correspond identically to the vectors $V_{32}$, $V_{33}$, and $V_{34}$, discussed hereinabove in connection with FIG. 8.

All then that remains in order to fully define the design of motor 30 is to set forth the relationships between the motor design tabulations of Veinott, and the corresponding transformed quantity which applies to and is definitive of the motor 30. This is best done in tabular form and is shown in Table I hereinbelow. Various angles in FIG. 10, referred to in Table I, are arbitrarily chosen to be indicated by symbols γ, ∩, and θ; and these angles are related or defined as indicated in Table I.

Table I

| Quantity | Value | Identification, Definition, Source |
|---|---|---|
| f | 60 | line frequency |
| $V_M$ | 115 | line voltage |
| $E_{C_1}$ | 141.4 | Veinott's tabulation |
| a | .714 | Veinott's tabulation |
| $X_{C_1}$ | 21.43 | Veinott's tabulation |
| $C_2$ | 100.0 | capacitance selected for capacitor 37 in FIG. 6 |
| $X_{C_2}$ | 26.53 | capacitive reactance of capacitor 37 |
| $E_{C_2}$ | 157.33 | voltage drop in capacitor 37 |
| α | 35.53° | $\tan^{-1} a$ |
| β | 84.47° | 120°-α; by trigonometric derivation from FIG. 10 |
| sin γ | .769 | $\frac{(E_{C_2} \sin \beta)}{\sqrt{(E_{C_2} \sin \beta)^2 + (V_M + E_{C_2} \cos \beta)^2}}$ (by derivation from FIG. 10) |
| γ | 50.27° | $\sin^{-1}(\sin \gamma)$ |
| φ | 9.73° | 60°-γ |
| θ | 25.80° | α-φ |
| L | .220 | $\frac{\sin \theta}{\sin \gamma}$; or $\frac{V_{33}}{V_{32}}$ |
| K | .774 | $(\frac{\sin \theta}{\sin \gamma})(\frac{E_{C_2}}{V_M})$; or $\frac{V_{34}}{V_{32}}$ |
| $d_I$ | 2.13 | $\frac{1}{\sqrt{L}}$ |
| $d_F$ | 1.14 | $\frac{1}{\sqrt{K}}$ |
| $N_p$ | .888 | $\frac{1}{(\cos \phi + a_I \cos \gamma)}$ |
| $d_p$ | .892 | $\frac{.841}{\sqrt{N_p}}$ |

The symbols and notation used in the above Table I are consistent with the terminology and notation used by Veinott. Moreover, the terminology used above is consistent with the notation that has been used in FIGS. 9 and 10 herein. Although the data presented in Table I above is self-explanatory; it should facilitate a more rapid understanding of the contents of Table I by specifically identifying particular quantities or terms which it has been necessary to coin for the purpose of providing specific terminology that would be applicable to the design and analysis of motors embodying the present invention.

For example, the multipliers or ratios $d_I$ and $d_F$ are factors that may be used (at least initially) for respectively determining the diameter of wire of the intermediate phase winding 33 and capacitor phase winding 34, once a wire diameter has been selected for the primary winding 32. Once wire of an available diameter has been chosen for primary phase winding 32 such diameter is multiplied by $d_I$ in order to determine a wire diameter that may initially be considered for intermediate phase winding 33. Similarly, the primary phase wire diameter is multiplied by $d_F$ to determine a wire diameter that may initially be considered for capacitor phase winding 34.

It is unlikely that wire having a diameter exactly equal to the diameters calculated by using the factors $d_I$ and $d_F$ will be available, so available sizes of wire having diameters close to the calculated sizes will preferably be selected for the winding phases 33 and 34. I have found that selection of available wire sizes does not substantially detract from the ability to produce motors embodying the invention and also capable of substantially balanced operation. This should be particularly noted with reference to prior art motors and design approaches wherein the necessity of selecting an available capacitor may cause a substantial departure from balanced operation.

The factors K and L (in Table I) have been defined previously hereinabove and are used in determining winding turns for the capacitor and intermediate winding phase, as well as for determining $d_I$ and $d_F$. Other quantities appearing in Table I to which particular attention should be called are angle β, $N_p$, and $d_p$. The angle β, for applications where the electrical space displacement between adjacent poles of winding phases 32, 33, and 34 is to be sixty electrical degrees (and vectors $V_{32}$, $V_{33}$, $V_{34}$ intersect at 120 degrees) will always be 120° minus α. This has been proved by trigonometric derivation from FIG. 10 using known trigonometric identities and relationships. However, inclusion of those derivation steps herein is not necessary for an understanding of the invention and therefore has been omitted in the interests of brevity.

$N_p$ is a multiplier that is used once the number of effective winding turns are selected for the primary winding of Veinott's tabulated motor according to known prior art procedures. For ease of description, it is now assumed that winding 26 of motor 25 (see FIG. 4) is the motor for which Veinott's tabulated data applies; and that the number of effective conductor turns of winding 26 is one hundred. In this case, the number of effective winding turns that would be provided in primary winding phase 32 (of FIG. 6) would be $N_p \times$ 100; or 88.8 effective turns.

The multiplier $d_p$ may be used to at least initially determine the size of wire that should be used in winding phase 32 (see FIG. 6); once the size of wire for winding 26 (see FIG. 4) has been selected by established prior art procedures. For example, if winding 26 (FIG. 4) were made up of wire having a diameter of 10.16 mm, then a wire diameter of approximately 8.29 mm ($d_p \times$ 10.16) would be used for primary phase winding 32 of motor 30 in FIG. 6.

It should now be appreciated that this specification discloses a preferred simplified method by which motors embodying the present invention may be designed for substantially balanced operation, even though such motors are supplied with power from a conventional single phase power source and off-the-shelf capacitors are used. However, it will be understood that alternative methods of designing such motors and/or additional techniques may be developed, by which motors falling within the invention may be designed and manufactured. For example, computers may be used to optimize a two winding "balanced" motor (rather than Veinott's procedure) and to calculate $\alpha$ for that particular motor. It also is preferred to utilize a computer for determining design parameters involving the parameters listed in Table I or any others needed for defining the actual winding circuits of motors embodying the invention.

It is usually desirable (because of current density in winding phase 32) to increase the size of wire for primary winding phase 32 by one or more wire sizes than would be indicated by the above-presented design analysis of Table I. Moreover, substantial material savings (without performance losses of the same magnitude may be achieved by substantially reducing the size of wire used in the intermediate winding phase 33 from that initially indicated by following Table I. In addition, depending on the design of the particular motor, some further material savings usually can be realized by making the capacitor phase winding from somewhat smaller wire than would be suggested by Table I. This also tends to equalize the current desity in all three winding phases.

It will be understood that either copper or aluminum winding material may be used in motors embodying the invention, and one or more of the winding phases may be made of copper material with the balance made of aluminum material. For example, depending upon the slot space available for winding turns, it would be feasible to make the main winding phase 32 of aluminum conductor while copper conductor would be utilized for the capacitor phase winding 34. The intermediate phase winding 33 then might be made of copper or aluminum (depending upon the slot space actually available for accommodating the conductors of intermediate phase winding 33).

Although the present invention has now been described and teachings presented which may be followed to produce motors embodying the present invention; some comparison of performance that might be expected by using the present invention will now be presented. This is done by comparing data for a prior art motor, constructed according to FIGS. 3 and 5, with data for motors embodying the invention and constructed as indicated in FIGS. 1 and 6 herein. This comparative data is now presented in Table II hereinbelow.

Table II

Comparative Performance and Design Data For Motors Connected For Full Load, High Speed Operation.

| Quantity | Prior Art Motor of FIGS. 3, 5 | Motor Embodying Present Invention |
|---|---|---|
| Number of Poles | 8 | 8 |
| Speed, rpm | 850 | 850 |
| Efficiency, % | 58.4 | 63.3 |
| Capacitor Voltage | 359 | 306 |
| Capacitor size, mfds. | 10 | 10 |
| Core Height, inches | 2.25 | 2.25 |
| Full Load Torque, oz-ft | 30.2 | 30.3 |
| Power Factor, % | 97.0 | 84.4 |
| Locked Rotor Torque, oz-ft but low speed connection | 5.3 | 3.5 |
| Forwad revolving field (in amperes) | 1.55 | 2.32 |
| Backward revolving field (in amperes) | 0.25 | 0.18 |
| Backward field to Forward field, % | 16.13 | 7.76 |

The prior art motor of FIG. 5 and the motor embodying the invention as illustrated in FIG. 1 (data for both of which is included in Table II) were designed to use rotors of literally the same design and to use stator cores as identical to one another as present day manufacturing techniques permit.

Although the prior art motor of FIG. 5 was optimized for efficiency by utilizing prior art computerized design procedures as they existed at the time when the motor of FIG. 5 was designed, no representation is intended to be made that the motor of FIG. 5 could not be further optimized. It also is preferred to utilize computerized techniques in the design of motors embodying the present invention, and this was in fact done for the motor of FIG. 1 (performance and design data for which has been presented in Table II; and manufacturing information for which is presented hereinbelow).

The data presented in Table II above is generally self-explanatory, so only a few remarks will be made to avoid any confusion in understanding the import of Table II. The formward revolving field and backward revolving field tabulated data is an indication of the magnitude of those fields as reflected or seen by, as the case may be, the main winding phase 18 of the motor of FIG. 3 or the primary phase winding 32 (see FIG. 6) of the motor of FIG. 1. The significance of this particular data is that it clearly reveals that the motor embodying the present invention is capable of substantially balanced operation because of its small backward revolving field.

It will be understood that variations of 5% in performance data for identical designs of mass produced motors is not uncommon. Accordingly, it would in reality be futile to attempt to define a term such as "perfectly balanced operation" so that it would bear a meaningful relationship to results actually obtainable in the motor art. However, it is presently believed that at least whenever the magnitude of the backward revolving field (of a single phase, capacitor induction motor) is equal to or less than 10% of the forward revolving field; "substantially balanced operation" will have been achieved. Using this criteria, the inventive motor data of Table II clearly shows that "substantially balanced operation" may now be achieved as a matter of common practice since the tabulated backward revolving field of 0.18 amperes was only about 7.76% of the 2.32 ampere forward revolving field and thus clearly less than 10%.

Substantially balanced operation not only contributes to increased efficiency (e.g., compare 63.3% efficiency to 58.4% efficiency in Table II), but also reduces pulsations in output torque which can provide the further benefit of contributing to a reduction in generated noise during motor operation.

While on the subject of efficiency, it is also now noted that motors designed to have higher numbers of poles or less full load torque inherently have lower efficiencies than motors with fewer numbers of poles or higher full load torque, (other things being kept as equal as possible). It is for this reason that an efficiency of 63.3% would perhaps not appear (at first glance) to be significant as compared to very high efficiencies described by others in the art — until the number of poles is also considered. Thus, fractional horsepower, four-pole motors embodying the present invention should exhibit even higher efficiencies — e.g., in the neighborhood of 70% (as compared to about 67% for prior art four-pole designs of fractional horsepower ratings).

The efficiency superiority of motors embodying the present invention is more evident for motor designs of higher pole numbers — and particularly those designed for multi-speed operation. This is at least partly due to the fact that the three winding phases 32, 33, 34 of a motor such as motor 30 have adjacent coil groups (or poles) spaced apart 60 electrical degrees; and that more uniform and relatively high core slot winding space factors may be achieved.

While motors that are capable of substantially balanced operation are certainly one of the potential benefits of utilizing the present invention; motors embodying the invention may also be design optimized to have a high power factor, although such motors would be slightly less balanced and somewhat less efficient than a "balanced operation" motor that has been design optimized for maximum efficiency.

The actual construction or manufacturing details of a motor corresponding to FIG. 1 (for which the data of Table II applies), and of the motor of FIG. 5 (for which the data of Table II applies) will now be presented in detail in order to provide a clear disclosure of what is presently believed to be a best mode of putting the invention into practice.

With particular reference now to FIG. 1, the stator assembly 31 includes a magnetic core 46 approximately two and one-quarter inches in length, and the cross-sectional or end view configuration of which is shown substantially to actual scale in the original drawings that form part of this specification.

As clearly revealed in FIG. 1, the core 41 includes 36 uniformly sized and spaced slots which have been numbered S1, S2, S3, ... S36. The winding circuit of the stator assembly 31 includes a plurality of winding sub-circuits made up of coil groups that establish, when energized, a magnetic field that induces rotation of a not-shown rotor in the bore 47. This rotor is, of course, supported by one or more bearings that may be supplied either by the motor manufacturer or by the motor user, depending on the application of the motor.

The coil groups shown in FIG. 1 establish winding sub-circuits that include phase windings 32, 33, and 34 (see FIG. 6), as well as an extended or supplemental winding section 36 (see FIG. 6). The sub-circuit comprises of section 36 would be omitted if multi-speed operation were not desired, although it is again noted that improved uniformity of slot space factor is particularly beneficial for multi-speed motors - and especially for those having four or more poles.

The coil groups of FIG. 1 include four concentric coil groups 48 and four concentric coil groups 49 that together comprise primary winding phase 32 of FIG. 6. The coil group 48 which occupies slots S1, S2, S4, and S5 has been arbitrarily selected as the "reference" pole or coil group for purposes of explaining the angular relationships of poles or coil groups of a given winding sub-circuit with respect to each other, and with respect to poles or coil groups of the other winding sub-circuits shown in FIG. 1. As used herein, "coil group" means a plurality of winding conductor turns that are arranged in one or more coils, each of which include one or more of such turns. Thus, coil group 48 includes two coils with a turn count and distribution as shown in Table III hereinbelow; whereas coil group 49 comprises one coil having the number of turns shown in Table III.

A reference line identified as 0°EL has been placed substantially along the apparent effective center of the "reference" coil group in FIG. 1. Similarly, reference lines identifies as 60°EL, 120°EL, and 180°EL have been used in FIG. 1 to identify the apparent effective centers of other coil groups in order to better illustrate that the space angle (in electrical degrees) between the effective centers of poles or coil groups of next adjacently located winding phases is sixty electrical degrees.

Although it is not conventional in the art to measure electrical degrees in opposite directions, this convention has been ignored in FIG. 1 in order to emphasize the spacing or pattern of coil groups of the FIG. 6 winding phases 32, 33, 34 on core 46 of FIG. 1. Thus, in FIG. 1, next adjacent poles or coil groups 48, 49 of the same winding phase 32 are displaced in space by an angle of 180°EL. This same relationship is also true of next adjacent poles or coil groups 52, 53 of intermediate phase winding 33; and of next adjacent poles or coil groups 56, 56 of capacitor phase winding 34. It is now again particularly noted and emphasized that a coil group of different ones of the three winding phases 32, 33, 34 is spacially located (i.e., effectively centered) at sixty electrical degree intervals about the core 46.

Reference is now made to poles or coil groups 58, 59 of the winding sub-circuit comprises of extra or supplemental winding section 36. It will be noted that the conductors or turn sides of these coil groups share slots respectively with conductors or turn sides of coil groups 52, 53. Thus, the spacial relationship of coil groups 58, 59 vis-a-vis each other as well as the coil groups of the other winding sub-circuits are also clearly defined by FIG. 1.

In order to further facilitate actual production of the winding circuit of FIG. 1, it is now additionally noted that primary phase winding 32 (i.e., coil groups 48, 49) was wound with copper magnet wire (i.e., varnished or enameled conductor) having a bare conductor size that was 21.3 mils in diameter (1 mil = 0.001 inch = 0.0254 mm). The bare diameter of the copper wire that was used for capacitor phase winding 34 (coil groups 56, 57)

was 19 mils; for intermediate phase winding 33 (coil groups 52, 53) was 22.6 and for section 36 (coil groups 58, 59) was 15 mils.

The actual winding turn distribution or count for the winding circuit of FIG. 1 (as well as that of later to be discussed FIG. 5) is tabulated in Table III hereinbelow. Table III also identifies the slot space factor or slot fill of each slot. For purposes of definition of the term "slot space factor" or "slot fill" as used herein, reference is now made to FIG. 2.

Figure 2:
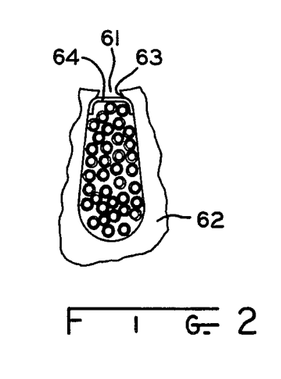
FIG. 2 is a view of a core slot having conductors therein, and is used to define the meaning of "space factor" as used herein.

In FIG. 2, a slot 61 of a core 62 has been shown, with a number of different sizes of insulated conductors disposed therein. The opening 63 of slot 61 is closed by a slot closure or wedge 64, and the area bounded by the interior walls of slot 61 and by the wedge 64 (exclusive of the area occupied by wedge 64) is defined to be the available slot area $A_s$; whereas the summation of or total cross sectional area of conductor material (exclusive of wire insulation) actually disposed in slot 61 is defined as $A_w$. Space factor or slot fill, SF, is then defined as the ratio of $A_w$ to $A_s$ (SF = $A_w/A_s$).

Turning now to FIG. 5; slots S1, S2, S3, . . . S36 have been identified to correspond with those shown in FIG. 1, since core 67 is substantially identical in all respects to core 46 of FIG. 1, and since this assists tabulation of data pertinent thereto (as will be done in Table III hereinbelow). In FIG. 5, the auxiliary coil groups of auxiliary winding 19 (FIG. 3) comprise coil groups 68, 69; main coil groups 71, 72 comprise the main winding 18 (FIG. 3); and extra (or extended) main coil groups 73, 74 comprise the extra main winding section 17 (FIG. 3). The number of coils per each coil group, slots occupied by the coil sides or conductors of each coil group, and spacial relationships therebetween are all as depicted in FIG. 5; and the actual number of turns of each coil group in each slot of FIG. 5 (as well as the space fill of each slot) is defined by Table III hereinbelow. The bare conductor diameter, in mils, of the copper wire used for windings 18, 19, and 17, respectively, was 19.00 mils, 20.10 mils, and 12.60 mils.

Table III is now presented to supplement the detailed description which has been presented hereinabove concerning the winding circuits of FIGS. 1 and 5.

Table III

| | FIG. 1 Turns | | | | | FIG. 5 Turns | | | |
|---|---|---|---|---|---|---|---|---|---|
| | Phase | | | Sct. | | Phase | | Sct. | |
| SLOT | 32 | 33 | 34 | 36 | SF | 18 | 19 | 17 | SF |
| S 1 | 71 | 67 | 0 | 0 | 44.5 | 106 | 0 | 31 | 30.4 |
| S 2 | 46 | 102 | 0 | 0 | 44.5 | 69 | 105 | 20 | 47.9 |
| S 3 | 0 | 90 | 46 | 31 | 49.3 | 0 | 120 | 0 | 32.2 |
| S 4 | 46 | 0 | 52 | 35 | 45.5 | 69 | 78 | 20 | 40.7 |
| S 5 | 71 | 0 | 35 | 23 | 45.5 | 106 | 0 | 31 | 30.4 |
| S 6 | 62 | 90 | 0 | 0 | 47.3 | 92 | 78 | 27 | 47.3 |
| S 7 | 0 | 102 | 35 | 23 | 46.2 | 0 | 120 | 0 | 32.2 |
| S 8 | 0 | 67 | 52 | 35 | 46.2 | 0 | 120 | 0 | 32.2 |
| S 9 | 62 | 0 | 46 | 31 | 48.4 | 92 | 78 | 27 | 47.3 |
| S10 | 71 | 67 | 0 | 0 | 44.5 | 106 | 0 | 31 | 30.4 |
| S11 | 46 | 102 | 0 | 0 | 44.5 | 69 | 78 | 20 | 40.7 |
| S12 | 0 | 90 | 46 | 31 | 49.3 | 0 | 120 | 0 | 32.2 |
| S13 | 46 | 0 | 52 | 35 | 45.5 | 69 | 105 | 20 | 47.9 |
| S14 | 71 | 0 | 35 | 23 | 45.5 | 106 | 0 | 31 | 30.4 |
| S15 | 62 | 90 | 0 | 0 | 47.3 | 92 | 0 | 27 | 26.4 |
| S16 | 0 | 102 | 35 | 23 | 46.2 | 0 | 105 | 0 | 28.2 |
| S17 | 0 | 67 | 52 | 35 | 46.2 | 0 | 105 | 0 | 28.2 |
| S18 | 62 | 0 | 46 | 31 | 48.4 | 92 | 0 | 27 | 26.4 |
| S19 | 71 | 67 | 0 | 0 | 44.5 | 106 | 0 | 31 | 30.4 |
| S20 | 46 | 102 | 0 | 0 | 44.5 | 69 | 105 | 20 | 47.9 |
| S21 | 0 | 90 | 46 | 31 | 49.3 | 0 | 120 | 0 | 32.2 |
| S22 | 46 | 0 | 52 | 35 | 45.5 | 69 | 78 | 20 | 40.7 |
| S23 | 71 | 0 | 35 | 23 | 45.5 | 106 | 0 | 31 | 30.4 |
| S24 | 62 | 90 | 0 | 0 | 47.3 | 92 | 78 | 27 | 47.3 |
| S25 | 0 | 102 | 35 | 23 | 46.2 | 0 | 120 | 0 | 32.2 |
| S26 | 0 | 67 | 52 | 35 | 46.2 | 0 | 120 | 0 | 32.2 |
| S27 | 62 | 0 | 46 | 31 | 48.4 | 92 | 78 | 27 | 47.3 |
| S28 | 71 | 67 | 0 | 0 | 44.5 | 106 | 0 | 31 | 30.4 |
| S29 | 46 | 102 | 0 | 0 | 44.5 | 69 | 78 | 20 | 40.7 |
| S30 | 0 | 90 | 46 | 31 | 49.5 | 0 | 120 | 0 | 32.2 |
| S31 | 46 | 0 | 52 | 35 | 45.5 | 69 | 105 | 20 | 47.9 |
| S32 | 71 | 0 | 35 | 23 | 45.5 | 106 | 0 | 31 | 30.4 |
| S33 | 62 | 90 | 0 | 0 | 47.3 | 92 | 0 | 27 | 26.4 |
| S34 | 0 | 102 | 35 | 23 | 46.2 | 0 | 105 | 0 | 28.2 |
| S35 | 0 | 67 | 52 | 35 | 46.2 | 0 | 105 | 0 | 28.2 |
| S36 | 62 | 0 | 46 | 31 | 48.4 | 92 | 0 | 27 | 26.4 |

It will be noted from Table III that the slots S1, S2, . . . S36 for the motor of FIG. 1 are filled to a much more uniform degree than are the slots of the motor of FIG. 5. Stated another way, the slots of the FIG. 5 motor which have the lowest degree of slot fill are, in effect, "conductor starved". However, in the case of the FIG. 5 motor, attempts to place more conductor material in the low space factor slots would be prevented because the requisite corresponding numbers of conductors could not be accommodated in the high space factor slots. This problem is obviously overcome with motors embodying the invention.

Although it should be apparent from Table III without further comment, it is noted that the conductors or turns for stator assembly 31 were distributed sinusoidally in a manner that is now common in the art, so the actual total number of turns differed from the total number of effective turns. With the turn distribution indicated by Table III, the number of effective turns (per pole) for the primary winding phase (phase 32 in FIG. 6) was 76.6; the number of effective turns (per pole) for the intermediate phase winding (phase 33 in FIG. 6) was 56.6; the number of effective turns (per pole) for the capacitor phase winding (phase 34 in FIG. 6) was 110.7; and the total number of effective turns (per pole) for the winding section 36 was 38.0.

Although it should now be apparent, it is also noted that optimized designs of preferred embodiments of the invention result in the selection of winding turn distributions such that the capacitor phase winding is provided with the highest number of effective turns, the primary phase winding is provided with the next highest number of effective turns; the intermediate phase winding is provided with a lower number of effective turns than either the primary or the capacitor phase winding; and the extra winding section 36 often will have less effective turns than the intermediate phase winding.

In order to provide a more clear correlation between FIGS. 1 and 6; and between FIGS. 3 and 5; identical designations such as "LM" "RM", etc. have been used to identify the ends or internalleads which extend from each of the winding sub-circuits described hereinabove.

Although the present invention has been described in detail herein in connection with a particular eight-pole multi-speed motor of the type that is usually used in air moving applications (e.g., fans and blowers), the invention is also of utility for motors of any desired number of poles or horsepower rating and for motors intended for other types of motor applications including — but obviously not limited to — hermetically sealed refrigerant compressor motor applications.

It will be appreciated by persons skilled in the art that the particular winding arrangement or circuit that has been illustrated in FIG. 1 for purposes of exemplification produces only real poles (as distinguished from consequent poles) during operation. However, the invention obviously may also be utilized when the motor winding circuit involves consequent pole winding arrangements. In other words, with a winding circuit as shown in FIG. 1, each instantaneous magnetic pole for each winding phase of the motor is established by a separate and readily identifiable coil group. If the winding circuit of FIG. 1 were modified, however, so that one coil group (comprising one or more coils) was used to establish a pair of poles for one (or more) of the winding phases, such modified winding phase would be properly describable as a consequent pole winding arrangement.

Persons of ordinary skill in the art are well aware of consequent pole winding arrangements and the differences and similarities of such arrangements vis-a-vis "real pole" winding arrangements. The less skilled reader who may not be as familiar with consequent pole winding arrangements is referred to standard reference works in the art for background information. One such reference work is "Fractional-And Sub-fractional-Horsepower Electric Motors" by Cyril G. Veinott, the third edition of which was published in 1970 by McGraw-Hill book company. This particular edition is assigned United States Library of Congress Catalog Card No. 79-85117.

With continued reference to FIG. 1, it is noted (discusion is here limited, in the interest of brevity, to the capacitor winding phase), that the winding turns which have been utilized to establish the coil groups 57 can be said to establish magnetic poles having an instantaneous polarity opposite to those established by the coil groups 56. However, the conductors of each coil group 57 could be included as part of the coil groups 56 adjacent thereto. In this case, and as will be understood, a number of turns corresponding in number to the number of conductors in one side of each coil 57 would establish or form a new outermost coil for each winding coil group 56. When this is done, the winding turn distribution in the windings slots S1 through S36 remains indentical to the winding turn distribution for winding phase 34 as indicated in Table III; but only four modified coil groups of three coils each are provided, and four "real" magnetic poles and four "consequent" magnetic poles are established during operatin. These four modified coil groups are, of course, interconnected so as to have the same instantaneous magnetic polarity, and the consequent poles would be of the opposite instantaneous magnetic polarity as compared to that of the real poles.

It should now be readily understood that the description hereinabove vis-a-vis the sixty electrical degree spacing between adjacent coil groups of different winding phases has been presented in the context of "real pole" winding arrangements only. The principles taught hereinabove are also applicable, however, to winding circuits that include one or more winding sub-circuits of the consequent pole type. In the event that a consequent pole arrangement is contemplated or actually used, one simply considers such consequent pole arrangement in terms of its equivalent real pole winding arrangement.

Thus the discussion hereinabove concerning the sixty electrical degree spatial relationship has been presented on a "real pole" winding arrangement basis (or "equivalent" real pole basis for motors where consequent pole arrangements are used).

It obviously is possible to relate the spatial relationships between the effective centers of adjacent coil groups of a given phase (as well as different phases) as a mathematical relationship involving a multiplier "$n$" - the value of which is dependent on whether a "real" or "consequent" pole arrangement is under consideration. For example, $n$ equals unity (one) for winding circuits of the type shown in FIG. 1; and the effective centers of next adjacent coil groups of different ones of the winding phases 32, 33, 34 are spaced apart $n \times 60$ electrical degrees, whereas the effective centers of next adjacent coil groups of each given phase 32, 33, or 34 are spaced apart $n \times 180$ electrical degrees.

However, when all of the winding phases 32, 33, 34 are of the consequent pole type, $n$ equals two ($n = 2$) by definition, and the spatial relationships between coil group effective centers is equal to $n \times 60$ and $n \times 180$ electrical degrees (i.e., 120° EL and 360° EL) respectively.

The relationships for applications where at least one sub-circuit is arranged as a "consequent" pole type and at least one other is a "real" pole type may, obviously, be readily arrived at; but it is preferred to avoid the need of relying on the multipliers "$n$" in connection with use of the present invention. Accordingly, it is preferred to simply refer to the spatial relationships between adjacent coil groups as those that are on a "real pole winding arrangement basis". Then, for consequent pole windings, one need only describe it on a "real pole basis" and identify the effective center of real coil groups that (if actually provided) would establish real poles corresponding to the consequent poles. Alternatively, motors embodying the invention may be described in terms of the spatial relationships of instantaneous magnetic poles or polar regions, where the effective center of such poles (i.e., polar axes) or polar regions are defined in a manner that now will be discussed, while still having reference to the winding arrangement of FIG. 1.

When the capacitor winding phase 34 is modified to be a consequent pole winding arrangement as above discussed by including the conductors of coil groups 57 as part of coil groups 56; the only real difference between an actual embodiment of such a modified arrangement and an arrangement constructed exactly as illustrated in FIG. 1, would be that the end turns associated with the conductors in slots S6, S9, S15, S18, S24, S27, S33, and S36 would be positioned in the same end turn bundle as the conductors of a coil group 56, and the modified coil groups 56 would be interconnected so as to establish real poles of a single given instantaneous polarity and consequent poles of the opposite instantaneous polarity. Therefore, to the casual observer, the modified arrangement might appear to involve a four-pole capacitor phase winding although, in reality, it would be an eight-pole consequent pole arrangement.

As is understood by persons of ordinary levels of skill in the art, an eight pole winding arrangement having eight real poles will establish eight instantaneous magnetic poles or "polar regions" of alternating polarity. The regions may, be definition, be identified as having instantaneous effective centers (or polar axes) coincident with or along the effective center of the coil groups which establish such polar regions. Similarly in an eight pole consequent pole winding arrangement (having four coil groups that establish four real poles of a first polarity and four consequent poles of a second or opposite polarity) eight instantaneous magnetic polar regions are established during operation such that adjacent polar regions are of opposite instantaneous polarities.

For the consequent pole arrangement presently being discussed, four of such instantaneous magnetic poles are by definition (for the purpose of this application) considered to have an effective center coincident with the effective center of the four coil groups during energization thereof. In addition, the four instantaneous consequent magnetic polar regions have (by definition) effective centers or polar axes that are spatially located midway between the effective centers of the four coil groups. By using terminology consistent with the definitions just presented it will be appreciated that embodiments of the present invention (in preferred forms) will be characterzied by winding groups that are arranged spatially on a magnetic core so that next adjacent instantaneous polar axes for a given winding phase (or sub-circuit) are spaced apart 180 electrical degrees, and so that next adjacent instantaneous magnetic polar regions of the different winding phases are spaced apart 60 electrical degrees — regardless of whether "real pole" or "consequent pole" arrangements are used.

By continuing to use terminology consistent with the other terms defined herein, it also should now be apparent that preferred embodiments of the invention — whether or not of the consequent pole type — will have coil groups arranged thereon such that the effective centers of next adjacent coil groups of the same instantaneous polarity within a given winding phase will be spaced apart 360 electrical degrees. The above discussion concerning instantaneous polar axes will be readily understood, and comparisons of my FIG. 1 structure with other arrangements may be facilitated by noting the arrowheads on representative winding end turns in FIG. 1. These arrowheads represent the relative direction of current in the windings so marked at one instant in time.

Benefits associated with the present invention in terms of uniform slot fill can of course be realized whether or not the winding circuit includes sub-circuits of the consequent pole type.

In order to better explain what is meant by "uniform" slot fill or space factor, reference is now again made to Table III. At the outset, it is noted that the slot fill for the FIG. 5 motor represented in Table III varied from a low of 26.4% to a high of 47.9%. The ratio of 47.9% to 26.4% is 1.814 and this ratio clearly reveals that almost twice as much conductor material was placed in those slots having a fill of 47.9 as compared to those slots having a slot fill of 26.4.

On the other hand, the range of slot fill for the motor of FIG. 1 was from 44.5% to 49.3%. The ratio of these percentages (49.3 to 44.5) is only 1.107. Thus, the degree of slot fill in each of the slots in the motor of FIG. 1 was "uniform" since the slot of greatest fill had only about 1.1 times as much conductor material therein as compared to those slots having the least amount of conductor material therein.

"Uniform slot fill", although not clearly defined in the prior art, is not defined herein to mean a slot fill condition where the ratio of the space factor for the fullest slot (in a given motor) to the space factor of the least full slot (of the same given motor) is no more than approximately 1.25.

The foregoing descriptions of preferred embodiments of the invention have concentrated on utilization of the invention to provide substantially balanced operation. It should nonetheless be noted that, for some applications, the voltage vector that would describe a desired capacitor having a selected nominal finite capacitance (to be used to provide substantially balanced operation) may be greater than the working voltage of such capacitor.

For example (and with reference to FIG. 10), for some applications, the vector $E_{C_2}$ may exceed 370 volts even though a 370 working volt capacitor must be used. In that event, the voltage vector $E_{C_2}$ is reduced to a value not exceeding 370 volts; and the windings for the primary, intermediate, and capacitor phase of the motor are selected as taught hereinabove. In this event, even though substantially balanced motor operation will not result, improvements in efficiency and uniformity of slot fill still will be realized and will be of substantial economic and performance benefits.

With reference for a moment now again to FIG. 6, it is to be understood that — whether or not a thermal protector is utilized — teachings of the present application may still be applied to great benefit. However, it is important to note that the teachings of the present invention may be applied even when it is desired to thermally protect all motor sub-circuits with a single protector device.

In addition, although one particular arrangement of the winding phases 32, 33 and 34 has been illustrated in FIG. 6; other equivalent winding arrangements may be provided. For example, the capacitor winding phase 34 may have lead or winding end F1 connected directly to end M1 of winding phase 32; and in this case the capacitor will be connected in series between winding end F2 and the juncture between winding phases 32 and 33.

The teachings presented hereinabove have been directed primarily to motors designed for substantially balanced operation when operating at high speed. Those teachings obviously may be applied when designing a motor so that substantially balanced operation will be obtained at medium or low speeds. For example, the winding section 36 has been shown as a single winding in FIG. 6. However, the winding 36 may have intermediate taps so that intermediate operating speeds could be obtained. Moreover, substantially balanced operation may be obtained at the low or medium speed operating points by adding sub-circuits (or coil groups) having spatial relationships and turn relationships in the manner taught hereinabove in order to select low or intermediate speed winding sub-circuits.

From the foregoing, it should now be understood that substantial benefits may be obtained by practicing the present invention. Therefore, while I have shown and described what at present are considered to be preferred embodiments of the invention, changes may be made therein without actually departing from the true spirit and scope of the invention. I therefore intend to cover in the following claims all such equivalent variations as fall within the invention.

What I claim as new and desire to secure by Letters Patent of the United States is:

1. A non-reversible induction motor particularly adapted for interconnection with a capacitor, for excitation from a single phase power source and for rotation in only one direction; said motor having a magnetic core and a winding circuit comprising at least three winding subcircuits arranged on a magnetic core for establishing a number of instantaneous magnetic poles when the capacitor is connected in series circuit relation with one of the subcircuits and the winding circuit is energized by a single phase power source; the winding circuit including first, second, and third winding phases each of which include winding turns for establishing spaced apart instantaneous magnetic polar regions; the winding turns of the first, second, and third winding phases being arranged circumferentially around the magnetic core so that the effective centers of next adjacent instantaneous magnetic polar regions of opposite instantaneous polarity of each given winding phase are spaced apart 180 electrical degrees around the core, and so that the effective centers of next adjacent successive ones of the instantaneous magnetic polar regions of the first, second, and third winding phases are spaced apart 60 electrical degrees around the core; wherein at least one of the winding phases is comprised of coil group winding turns that are arranged for establishing at least one real pole and at least one consequent pole; wherein the first winding phase is a primary phase winding comprising wire of a first size, the second winding phase is a capacitor winding comprising wire of a second size smaller than said first size, and the third winding phase is an intermediate phase winding comprising wire of a third size larger than said first size; and wherein said windings each comprise a different number of effective wire turns with the capacitor phase winding having more effective turns than either the primary phase winding or intermediate phase winding, and the intermediate phase winding has less effective turns than either the primary phase winding or the capacitor phase winding.

2. A non-reversible induction motor particularlly adapted for interconnection with a capacitor, for excitation from a single phase power source and for rotation in only one direction; said motor having a magnetic core and a winding circuit comprising at least three winding subcircuits arranged on a magnetic core for establishing a number of instantaneous magnetic poles when the capacitor is connected in series circuit relation with one of the subcircuits and winding circuit is energized by a single phase power source; the winding circuit including first, second, and third winding phases each of which include winding turns for establishing spaced apart instantaneous magnetic polar regions; the winding turns of the first, second, and third winding phases being arranged circumferentially around the magnetic core so that the effective centers of next adjacent instantaneous magnetic polar regions of opposite instantaneous polarity of each given winding phase are spaced apart 180 electrical degrees around the core, and so that the effective centers of next adjacent successive ones of the instantaneous magnetic polar regions of the first, second, and third winding phases are spaced apart 60 electrical degrees around the core; and wherein the third winding phase comprises winding conductor material of a first size; the first winding phase comprises winding conductor material of a second size larger than said first size; and the second winding phase comprises winding conductor material of a third size that is larger than said first size or said second size.

3. The invention of claim 2 wherein at least one of the winding phases comprises at least one winding coil group that includes at least two winding coils.

4. The invention of claim 3 wherein said first winding phase comprises a primary winding phase.

5. The invention of claim 4 wherein a winding section in addition to the first, second, and third winding phases is arranged on the core; and wherein the speed of operation of the motor is at least partly dependent on whether said winding section is energized.

6. The invention of claim 4 wherein said first winding phase comprises a capacitor winding phase; and the capacitor winding phase has more effective conductor turns than the primary winding phase.

7. The invention of claim 6 wherein the motor is a multi-speed motor.

8. A non-reversible induction motor particularly adapted for interconnection with a capacitor, for excitation from a single phase power source and for rotation in only one direction; said motor having a magnetic core and a winding circuit comprising at least three winding subcircuits arranged on a magnetic core for establishing a number of instantaneous magnetic poles when the capacitor is connected in series circuit relation with one of the subcircuits and the winding circuit is energized by a single phase power source; the winding circuit including first, second, and third winding phases each of which include winding turns for establishing spaced apart instantaneous magnetic polar regions; the winding turns of the first, second, and third winding phases being arranged circumferentially around the magnetic core so that the effective centers of next adjacent instantaneous magnetic polar regions of opposite instantaneous polarity of each given winding phase are spaced apart 180 electrical degrees around the core, and so that the effective centers of next adjacent successive ones of the instantaneous magnetic polar regions of the first, second and third winding phases are spaced apart 60 electrical degress around the core; and wherein the first winding phase is a primary phase winding, the second winding phase is an intermediate phase winding, and the third winding phase is a capacitor phase winding; said windings each comprising a different number of effective conductor turns with the capacitor phase winding having more effective turns than either the primary phase winding or intermediate phase winding, and the intermediate phase winding having less effective turns than either the primary phase winding or the capacitor phase winding.

9. The invention of claim 8 wherein at least some of the winding turns of at least one of the first, second, and third winding phases are arranged to form at least one group of at least two differently sized but concentric coils.

10. The invention of claim 8 wherein the primary phase winding comprises conductor material larger than the conductor material of the capacitor phase winding.

11. The invention of claim 10 wherein the motor is a multi-speed motor and has the same number of poles for each operational speed.

12. An induction motor particularly adapted for interconnection with a capacitor and for excitation from a single phase power source; said motor having a magnetic core and a winding circuit comprising at least three winding subcircuits arranged on a magnetic core for establishing a number of instantaneous magnetic poles when the capacitor is connected in series circuit relation with one of the subcircuits and winding circuit is energized by a single phase power source; the winding circuit including first, second, and third winding phases each of which include winding turns for establishing spaced apart instantaneous magnetic polar regions; the winding turns of the first, second, and third winding phases being arranged circumferentially around the magnetic core so that the effective centers of next adjacent instantaneus magnetic polar regions of opposite instantaneous polarity of each given winding phase are spaced apart 180 electrical degrees around the core, and so that the effective centers of next adjacent successive ones of the instantaneous magnetic polar regions of the first, second, and third winding phases are spaced apart 60 electrical degrees around the core; wherein the first winding phase is a primary phase winding, the second winding phase is an intermediate phase winding, and the third winding phase is a capacitor phase winding; said windings each comprising a different number of effective conductor turns with the capacitor phase winding having more effective turns than either the primary phase winding or intermediate phase winding, and the intermediate phase winding having less effective turns than either the primary phase winding or the capacitor phase winding; and wherein the capacitor phase winding comprises winding conductor material of a first size, the primary winding comprises winding conductor material of a second size larger than said first size, and the intermediate phase winding comprises winding conductor material of a third size that is larger than said first size or said second size.

13. The invention of claim 6 wherein the motor is a multispeed, six pole, fractional horsepower motor.

14. The invention of claim 12 wherein at least some of the winding turns of at least one of the first, second, and third winding phases are arranged to form at least one group of at least two differently sized but concentric coils.

15. The invention of claim 12 wherein said motor is particularly adapted for rotation in only one direction.

16. The invention of claim 15 wherein at least some of the winding turns of at least one of the winding phases are arranged to form at least one group of at least two differently sized but concentric coils.

17. A fractional horsepower induction motor particularly adapted for interconnection with a capacitor having a selected nominal finite capacitance and for excitation from a single phase power source; said motor having a motor circuit comprising at least three winding subcircuits arranged to establish a winding circuit impedance for providing substantially balanced operation when the capacitor is connected in series circuit relation with one of the subcircuits and the winding circuit is energized by a single phase power source; said motor including a magnetic core, and the winding circuit including first, second, and third winding phases each of which include winding turns for establishment of at least two instantaneous magnetic polar regions; the winding turns of the first, second, and third winding phases being arranged circumferentially around the magnetic core so that the effective centers of next adjacent instantaneous magnetic polar regions of each given winding phase are spaced apart 180 electrical degrees around the core, and so that the effective centers of next adjacent successive ones of the instantaneous magnetic polar regions of the first, second, and third winding phases are spaced apart 60 electrical degrees around the core; wherein the first winding phase is a primary phase winding, the second winding phase is an intermediate phase winding, and the third winding phase is a capacitor phase winding; said windings each comprising a different number of conductor effective turns with the capacitor phase winding having more effective turns than either the primary phase winding or intermediate phase winding, and the intermediate phase winding having less effective turns than either the primary phase winding or the capacitor phase winding; and wherein said phase windings are each comprised of wire of a different size with the intermediate phase winding formed of wire of the largest size of the three and the capacitor phase winding formed of wire of the smallest size of the three.

18. The invention of claim 17 wherein at least one of said coil groups comprise at least two differently sized but concentric coils.

19. The invention of claim 9 wherein the motor is particularly adapted for rotation in only one direction, and wherein at least some of the winding turns of at least one of the winding phases are arranged to form at least two concentric coils of different spans.

20. The invention of claim 18 wherein the motor is particularly adapted for rotation in only one direction and for operation in a substantially balanced condition only when caused to be operable in that same one direction, and wherein the primary phase winding comprises conductor material that is larger than the conductor material of the capacitor phase winding.

21. In an induction motor particularly adapted for interconnection with a capacitor and excitation by a single phase power source, the motor comprising a magnetic core having axially extending and circumferentially spaced apart slots disposed therein and also comprising a winding circuit formed of turns of conductive material that are supported in a plurality of the slots, the improvement wherein: said winding circuit includes at least first, second, and third subcircuits formed of coil groups for establishing magnetic polar regions; the coil groups of the first, second and third subcircuits are disposed in slots of the magnetic core and arranged in the core slots so that the instantaneous polar axes of next adjacent polar regions of each given subcircuit are spaced apart 180 electrical degrees, and the instantaneous polar axes of next adjacent polar regions of the first, second, and third subcircuits are spaced apart 60 electrical degrees; said third subcircuit has a number of effective conductor turns greater than the number of effective conductor turns of either the first or second subcircuits and is therefore identifiable as a capacitor phase winding for connection between a capacitor and an electrical juncture between the first and second subcircuits; and wherein the motor is particularly adapted for multi-speed operation and further comprises at least one additional winding subcircuit formed of a plurality of conductor turns; said motor being operable at a reduced speed upon excitation of the at least one additional winding subcircuit at the same time as the first, second, and third subcircuits; and wherein said second subcircuit comprises less effective conductor turns than either the first or third subcircuits, and the winding turns of the fourth subcircuit share core slots with winding turns of the second subcircuit whereby core slot space factor uniformity may be provided.

22. The invention of claim 21 wherein the first subcircuit and second subcircuit are connected together at one juncture, and a first end of the second subcircuit is connected to the juncture of the first subcircuit and third subcircuit, and a thermal protector is connected to a second end of the second subcircuit and in series circuit relation between the second and fourth subcircuits.

23. In an induction motor particularly adapted for interconnection with a capacitor and excitation by a single phase power source, the motor comprising a magnetic core having axially extending and circumferentially spaced apart slots disposed therein and also comprising a winding circuit formed of turns of conductive material that are supported in a plurality of the slots, the improvement wherein: said winding circuit includes at least first, second, and third subcircuits formed of coil groups for establishing magnetic polar regions; the coil groups of the first, second and third subcircuits are disposed in slots of the magnetic core and arranged in the core slots so that the instantaneous polar axes of next adjacent polar regions of each given subcircuit are spaced apart 180 electrical degrees, and the instantaneous polar axes of next adjacent polar regions of the first, second, and third subcircuits are spaced apart 60 electrical degrees; said third subcircuit has a number of effective conductor turns greater than the number of effective conductor turns of either the first or second subcircuits and is therefore identifiable as a capacitor phase winding for connection between a capacitor and an electrical juncture between the first and second subcircuits; and wherein the voltage vectors of the first, second, and third subcircuits are mutually directed at angles of substantially 120° relative to one another upon excitation of the winding circuit and when a capacitor is connected between the third subcircuit and a power supply lead.

24. In an induction motor particularly adapted for interconnection with a capacitor and excitation by a single phase power source, the motor comprising a magnetic core having axially extending and circumferentially spaced apart slots disposed therein and also comprising a winding circuit formed of turns of conductive material that are supported in a plurality of the slots, the improvement wherein: said winding circuit includes at least first, second, and third subcircuits formed of coil groups for establishing magnetic polar regions; the coil groups of the first, second and third subcircuits are disposed in slots of the magnetic core and arranged in the core slots so that the instantaneous polar axes of next adjacent polar regions of each given subcircuit are spaced apart 180 electrical degrees, and the instantaneous polar axes of next adjacent polar regions of the first, second, and third subcircuits are spaced apart 60 electrical degrees; said third subcircuit has a number of effective conductor turns greater than the number of effective conductor turns of either the first or second subcircuits and is therefore identifiable as a capacitor phase winding for connection between a capacitor and an electrical juncture between the first and second subcircuits; and wherein the motor is particularly adapted for multi-speed operation and further comprises at least one additional winding subcircuit formed of a plurality of conductor turns; said motor being operable to drive a given load device at a first speed when only the first, second, and third subcircuits are energized, and operable to drive the same given load device at a speed lower than the first speed when the at least one additional winding subcircuit is excited at the same time as the first, second, and third subcircuits.

25. The invention of claim 24 wherein at least one of the winding subcircuits comprises a plurality of winding turns arranged to form at least one group of at least two concentric coils of different spans; and the third subcircuit comprises a capacitor winding phase and is formed of conductor material of a smaller size than the size of the conductor material of either the first or second subcircuits.

26. An induction motor particularly adapted to be interconnected with a capacitor and excited by a single phase power source, the motor comprising a magnetic core having turns of conductive material supported thereon to form a winding circuit, the improvement wherein: said winding circuit includes at least first, second, and third subcircuits established by a plurality of coil groups for establishing magnetic polar regions upon excitation thereof; the coil groups are arranged on the core so that instantaneous effective centers of next adjacent polar regions established by each subcircuit are spaced apart 180 electrical degrees, and so that the instantaneous effective centers of next adjacent successive polar regions established by first, second, and third subcircuits are spaced apart 60 electrical degrees; said third subcircuit has a number of effective conductor turns that is greater than the number of effective conductor turns of either the first or second subcircuits, and therefor is identifiable as a capacitor phase winding for connection between a capacitor and an electrical juncture between the first and second subcircuits; and wherein the motor is particularly adapted for multi-speed operation and further comprises at least one additional winding subcircuit; and said second subcircuit comprises less effective conductor turns than either the first or third subcircuits.

27. An induction motor, particularly adapted to be interconnected with a capacitor and excited by a single phase power source, comprising a magnetic core having uniformly sized slots spaced uniformly thereabout and conductive material supported in a plurality of the slots to form a winding circuit; said winding circuit including first, second, and third winding phases each of which comprise a plurality of winding conductors; the winding conductors of the first, second, and third phases being disposed in slots of the magnetic core and arranged circumferentially around the core for establishing instantaneous magnetic polar regions with the effective centers of next adjacent instantaneous magnetic polar regions established by winding conductors of each given winding phase spaced apart 180 electrical degrees, and with the effective centers of next adjacent instantaneous magnetic polar regions established by winding conductors of different ones of the first, second, and third winding phases spaced apart 60 electrical degrees; and wherein said third winding phase comprises a number of effective conductor turns that are greater than the number of effective conductor turns of either the first or second phases, and therefore is identifiable as a capacitor phase winding for connection between a capacitor and an electrical juncture between the first and second winding phases during excitation of the motor; and wherein winding conductors of at least one of the winding phases are arranged in the form of at least one coil group that includes at least two coils of conductor turns.

28. The invention of claim 27 wherein the first winding phase includes winding conductor material of a size greater than the size winding conductor material in the capacitor phase, and wherein the first winding phase comprises a number of effective conductor turns greater than the number of effective conductor turns of the second phase.

29. The invention of claim 28 wherein at least one of the winding phases comprises a plurality of conductor turns arranged to form a group of at least two concentric coils of different spans.

30. The invention of claim 28 wherein each of the winding phases comprises at least one multi-coil coil group wherein the coils in each of the groups are differently sized and also concentric within each respective group.

31. An induction motor, particularly adapted to be interconnected with a capacitor and excited by a single phase power source, comprising a magnetic core having uniformly sized slots spaced uniformly thereabout and conductive material supported in a plurality of the slots to form a winding circuit; said winding circuit including first, second, and third winding phases each of which comprise a plurality of winding conductors; the winding conductors of the first, second, and third phases being disposed in slots of the magnetic core and arranged circumferentially around the core for establishing instantaneous magnetic polar regions with the effective centers of next adjacent instantaneous magnetic polar regions established by winding conductors of each given winding phase spaced apart 180 electrical degrees, and with the effective centers of next adjacent instantaneous magnetic polar regions established by winding conductors of different ones of the first, second, and third winding phases spaced apart 60 electrical degrees; and wherein the motor is particularly adapted for multi-speed operation and further comprises a winding subcircuit formed of a plurality of conductors; said motor being operable at a reduced speed when the at least one additional winding subcircuit is excited at the same time as the first, second, and third winding phases; and wherein said second winding phase comprises less effective conductor turns than either the first or third winding phases, and the winding turns of the winding subcircuit share core slots with winding turns of the second winding phase.

32. An induction motor, particularly adapted to be interconnected with a capacitor and excited by a single phase power source, comprising a magnetic core having uniformly sized slots spaced uniformly thereabout and conductive material supported in a plurality of the slots to form a winding circuit; said winding circuit including first, second, and third winding phases each of which comprise a plurality of winding conductors; the winding conductors of the first, second, and third phases being disposed in slots of the magnetic core and arranged circumferentially around the core for establishing instantaneous magnetic polar regions with the effective centers of next adjacent instantaneous magnetic polar regions established by winding conductors of each given winding phase spaced apart 180 electrical degrees, and with the effective centers of next adjacent instantaneous magnetic polar regions established by winding conductors of different ones of the first, second, and third winding phases spaced apart 60 electrical degrees; and wherein the third winding phase comprises a capacitor winding phase and the first winding phase comprises a primary winding phase; a first end of the primary winding phase is interconnected with a first end of the capacitor winding phase, and a capacitor is connected between the second ends of the primary and capacitor winding phases; the capacitor winding phase comprises more effective conductor turns than the primary winding phase; and the primary winding phase comprises conductor material larger than the conductor material of the capacitor winding phase.

33. The invention of claim 32 wherein the second winding phase comprises an intermediate winding phase having a first end thereof connected to the first end of the primary winding phase, whereby single phase power may be applied only across the second end of the intermediate winding phase and the second end of the primary winding phase.

34. An induction motor, particularly adapted to be interconnected with a capacitor and excited by a single phase power source, comprising a magnetic core having uniformly sized slots spaced uniformly thereabout and conductive material supported on the core to form a winding circuit; said winding circuit including first, second, and third winding subcircuits each of which comprise at least two grups of winding conductors; at least one group of the winding conductors comprising at least two concentric coils of different spans, the winding conductor groups of the first, second, and third subcircuits being disposed in slots of the magnetic core and arranged circumferentially around the core so that on a real pole winding arrangement basis the effective centers of next adjacent groups of winding conductors of each given winding subcircuit are spaced apart 180 electrical degrees around the core, and so that on a real pole winding arrangement basis the effective centers of next adjacent groups of winding conductors of next adjacent successive ones of the first, second, and third winding phases are spaced apart 60 electrical degrees around the core, and wherein said third winding subcircuit comprises a number of effective conductor turns that are greater than the number of effective conductor turns of either the first or second subcircuit, and therefore is identifiable as a capacitor phase winding for connection between a capacitor and an electrical juncture between the first and second winding subcircuits.

35. An induction motor particularly adapted for interconnection with a capacitor and for excitation from a single phase power source; said motor having a magnetic core and a winding circuit comprising at least three winding subcircuits arranged on a magnetic core for establishing a number of instantaneous magnetic poles when the capacitor is connected in series circuit relation with one of the subcircuits and the winding circuit is energized by a single phase power source; said motor including a magnetic core, and the winding circuit including first, second, and third winding phases each of which include winding conductors arranged in groups around the core for establishing spaced apart instantaneous magnetic poles; the winding conductors of the first, second and third winding phases being arranged circumferentially around the magnetic core so that the effective centers of next adjacent instantaneous magnetic poles of opposite instantaneous polarity of each given winding phase are spaced apart 180 electrical degrees around the core, and so that the effective centers of next adjacent successive ones of the instantaneous magnetic poles of the first, second, and third winding phases are spaced apart 60 electrical degrees around the core; and wherein the core includes a plurality of slots; the winding turns of the winding circuit are disposed in the slots; the slots have uniform space factors; and the conductor groups are arranged, on a real pole winding arrangement basis, on the core so that the effective centers of such conductor groups of the first, second, and third winding phases are spaced apart 60 electrical degrees around the core.

36. The invention of claim 27 wherein the slots in the core are uniformly spaced circumferentially around the core and are of a uniform size.

* * * * *

UNITED STATES PATENT AND TRADEMARK OFFICE
CERTIFICATE OF CORRECTION

PATENT NO. : 4,100,444
DATED : July 11, 1978
INVENTOR(S) : John H. Boyd, Jr.

It is certified that error appears in the above-identified patent and that said Letters Patent are hereby corrected as shown below:

```
Col. 4,  line 64  delete "effectively" and insert --effective--.
Col. 6,  line 8   delete "of" and insert --Of--;
         line 10  delete "leds" and insert --leads--.
Col. 7,  line 67  delete "26" (second occurrence) and insert --27--.
Col. 8,  line 11  delete "not" and insert --now--.
Col. 10, line 13  delete "26.52" and insert --26.53--.
Col. 11, line 23  delete "nd" and insert --and--.
Col. 13, line 52  delete "desity" and insert --density--.
Col. 14, line 25  delete "forwad" and insert --forward--;
         line 51  delete "formward" and insert --forward--.
Col. 16, line 7   delete "prises" and insert --prised--;
         line 47  delete "56" and insert --57--.
Col. 18, Table III, Line S30 delete "49.5" and insert --49.3--;
         line 56  delete "internalleads" and insert --internal
                  leads--.
Col. 20, line 61  delete "be" first occurrence, and insert --by--.
Col. 21, line 61  delete "not" and insert --now--.
Col. 24, line 59  after "and" insert --the--.
Col. 30, line 11  delete "grups" and insert --groups--.
```

Signed and Sealed this

Twenty-fifth Day of September 1979

[SEAL]

Attest:

LUTRELLE F. PARKER

Attesting Officer    Acting Commissioner of Patents and Trademarks